(12) United States Patent
Rhyne et al.

(10) Patent No.: US 7,013,939 B2
(45) Date of Patent: Mar. 21, 2006

(54) COMPLIANT WHEEL

(75) Inventors: Timothy B. Rhyne, Greenville, SC (US); Steven M. Cron, Simpsonville, SC (US); Jean-Pierre Pompier, Greenville, SC (US)

(73) Assignee: Michelin Recherche et Technique S.A., (CH)

( * ) Notice: Subject to any disclaimer, the term of this patent is extended or adjusted under 35 U.S.C. 154(b) by 0 days.

(21) Appl. No.: 10/618,924

(22) Filed: Jul. 14, 2003

(65) Prior Publication Data

US 2004/0012246 A1    Jan. 22, 2004

Related U.S. Application Data

(63) Continuation-in-part of application No. PCT/US01/26379, filed on Aug. 24, 2001.

(51) Int. Cl.
*B60B 9/26* (2006.01)

(52) U.S. Cl. .......................... 152/5; 152/246; 152/270

(58) Field of Classification Search .................... 152/1, 152/5, 7, 11, 12, 69, 80, 246, 270, 273, 275, 152/280

See application file for complete search history.

(56) References Cited

U.S. PATENT DOCUMENTS

| | | | | |
|---|---|---|---|---|
| 1,502,908 A | * | 7/1924 | Cozatt | 152/5 |
| 4,832,098 A | * | 5/1989 | Palinkas et al. | 152/7 |
| 4,917,162 A | * | 4/1990 | De Longcamp | 152/5 |
| 4,921,029 A | * | 5/1990 | Palinkas et al. | 152/11 |
| 4,945,962 A | * | 8/1990 | Pajtas | 152/7 |
| 5,139,066 A | * | 8/1992 | Jarman | 152/7 |
| 6,170,544 B1 | * | 1/2001 | Hottebart | 152/11 |

FOREIGN PATENT DOCUMENTS

| | | | |
|---|---|---|---|
| JP | 1-311902 | * | 12/1989 |
| WO | WO 018332 | | 3/2003 |

* cited by examiner

*Primary Examiner*—Russell D. Stormer
(74) *Attorney, Agent, or Firm*—E. Martin Remick; Adam Arnold

(57) ABSTRACT

A compliant wheel includes a compliant band and a plurality of web spokes extending transversely across and inward from the reinforced compliant band for attachment to a hub. The compliant band bends to comply with a contact surface and to envelope obstacles. The web spokes transmit load forces between the compliant band and the hub through tension in the web spokes not connected to the ground contacting portion of the wheel. The outer surface of the compliant band may be formed to include a tread, or a separate tread band may be attached.

19 Claims, 7 Drawing Sheets

COMPLIANT WHEEL

This is a continuation-in-part of PCT/US01/26379, filed Aug. 24, 2001, which designates the United States of America.

BACKGROUND AND SUMMARY OF THE INVENTION

The invention relates to non-pneumatic, structurally supported tires and wheels. More particularly, the invention relates to a compliant wheel that supports a load with its structural components and has pneumatic tire-like performance capabilities to serve as a replacement for and improvement over pneumatic tires.

The pneumatic tire is the best known solution for compliance, comfort, mass, and rolling resistance; however, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Conventional solid tires, spring tires, and cushion tires, although lacking the need for maintenance and the susceptibility to damage of pneumatic tires, unfortunately lack its performance advantages. In particular, solid and cushion tires typically include a solid rim surrounded by a resilient material layer. These tires rely on compression of the ground-contacting portion of the resilient layer directly under the load for load support. These types of tires can be heavy and stiff and lack the shock absorbing capability of pneumatic tires.

Spring tires typically have a rigid wood, metal or plastic ring with springs or spring like elements connecting it to a hub. While the hub is thereby suspended by the springs, the inflexible ring has only a small contact area with the road, which offers essentially no compliance, and provides poor traction and steering control.

Accordingly, except in limited situations, known non-pneumatic tires have not found wide use as substitutes for pneumatic tires.

A non-pneumatic, compliant wheel having performance characteristics similar to those of pneumatic tires, while improving on its disadvantages, would overcome the various deficiencies in the art and would be a welcome improvement.

A compliant wheel in accordance with the invention includes a compliant band that supports the load on the wheel hub and a plurality of tensile supporting elements that transmit in tension the load forces between the band and the hub. The tensile supporting elements are substantially non-load bearing in compression and provide pneumatic tire-like suspension to the hub.

According to a preferred embodiment, the tensile supporting elements are web spokes, sheet-like elements formed of an elastomeric material to provide tensile supporting force and flexibility when in compression. Other tension transmitting elements could also be used, for example, cords or cables, and the description of web spokes is not intended to limit the invention.

According to one embodiment, a compliant wheel includes a compliant band, a plurality of web spokes extending transversely across and substantially radially inward from the compliant band toward a wheel axis, and means for interconnecting the web spokes to a hub.

According to another embodiment, the compliant wheel includes a tread or wear portion formed on or mounted to the radially outer surface of the compliant band.

For the purposes of the following description, the term "hub" refers to any device or structure for supporting the wheel and mounting it to a vehicle axle.

The compliant band is formed of a material capable of deforming under load, including bending of the band, to envelope obstacles and to conform to a contact surface, such as a road or floor. In particular, bending deformation of the band under load forms a contact patch with the contact surface, which provides pneumatic tire-like transmission of traction and steering forces. One aspect of the compliance of the wheel material is that the amount of bending of the band relates to the magnitude of the load on the wheel.

The compliant band may be formed of an elastomeric material, such as natural or synthetic rubber, polyurethane, foamed rubber and foamed polyurethane, segmented copolyesters and block co-polymers of nylon. Preferably, the material has an elastic modulus of about 9 MPa to about 60 MPa. The band may be unreinforced, or may include a reinforcing ply to increase the band's circumferential inextensibility.

The web spokes interconnect the hub and compliant band and act in tension to transmit load forces between the hub and the band. This provides, among other functions, support for the mass of a vehicle. Load support forces are generated by tension in the web spokes not connected to the ground-contacting portion of the band. The loaded hub can be said to hang from the upper portion of the compliant band, which defines an arch supporting the load.

Preferably, the web spokes have a high effective stiffness in tension and a low effective stiffness in compression. The low stiffness in compression allows the web spokes attached to the ground-contacting portion of the compliant band to accommodate deformation of the ground-contacting portion of the compliant band without transmitting significant vertical load. The web spokes are relatively thin compared to their length, and typically, will bend in compression. The lack of compressive load support by the web spokes in the contact region allows the band to more easily form the contact patch and to more easily bend to absorb obstacles. In addition, because there is no direct connection from the ground to the hub, i.e., road shock must travel around the compliant band and through the tensioned web spokes, the compliant wheel has improved comfort and shock absorption compared to pneumatic tires.

The web spokes also transmit the forces required for accelerating, stopping, and cornering. The arrangement and orientation of the web spokes can be selected to obtain the desired function. For example, in applications where relatively low circumferential stiffness is desired, the web spokes can be arranged radially and in parallel with the compliant wheel axis of rotation. To increase stiffness in the circumferential direction, web spokes perpendicular to the axis of rotation can be added, alternating with the axis-aligned web spokes. Another alternative is to arrange the web spokes oblique to the compliant wheel axis to provide stiffness in both the circumferential and axial directions. Another alternative is to orient the web spokes to be in an alternating oblique arrangement, that is, in a zig-zag pattern when viewed on the equatorial plane. Of course, other similar arrangements could be used to tailor the circumferential stiffness of the wheel.

To facilitate the bending of the web spokes of the ground contacting portion of the tread, the spokes can be curved. Alternatively, the web spokes can be shaped during molding to have a predisposition to bend in a particular direction. Another alternative is to provide a connection between the hub and web spokes or between the ring and web spokes that acts in tension but allows relative movement of the web spoke in compression.

According to a preferred embodiment of the invention, a compliant wheel comprises a hub, a compliant, load supporting band disposed radially outward and concentrically with the hub, and a plurality of web spokes extending between the hub and the compliant band, wherein the compliant band comprises a reinforcing membrane or ply embedded in the band. Preferably, the reinforcing ply comprises cords aligned in the circumferential direction embedded in an elastomeric layer. According to this embodiment, the reinforcing ply acts to constrain the circumferential length of the band under load forces for better application of tension to the web spokes, which increases the load carrying capability.

According to another aspect of this embodiment, the membrane or reinforcing ply has a longitudinal tensile modulus greater than the elastic modulus of the band.

According to yet another aspect of this embodiment, the membrane or reinforcing ply is positioned approximately at the neutral axis of the compliant band. More preferably, the reinforcing ply is positioned radially inward of the neutral axis.

BRIEF DESCRIPTION OF THE DRAWINGS

The invention will be better understood through reference to the following description and the appended drawings, in which.

DETAILED DESCRIPTION OF THE INVENTION

Figure 1:
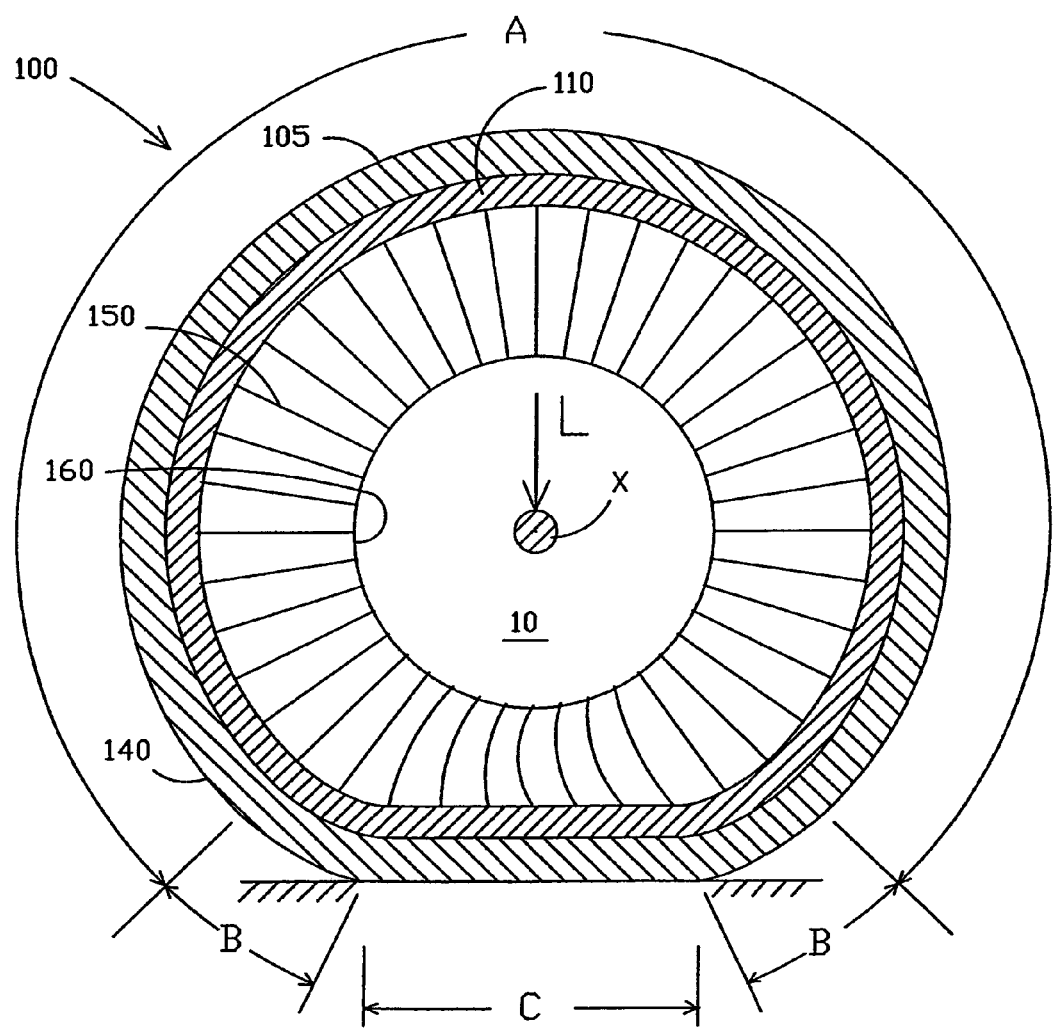
FIG. 1 is a schematic view in the equatorial plane of a compliant wheel of the invention under load demonstrating compliance of the wheel with the supporting surface.

The following terms are defined as follows for this description:

"Equatorial Plane" means a plane that passes perpendicular to the wheel axis of rotation and bisects the wheel structure.

"Meridian Plane" means a plane that passes through and includes the axis of rotation of the wheel.

"Modulus" of elastomeric materials means the tensile modulus of elasticity at 10% elongation measured per ASTM Standard Test Method D412.

"Hysteresis" means the dynamic loss tangent (tan δ) measured at operating strain, temperature, and frequency. One of ordinary skill in the art will understand that the operating conditions differ for particular applications, for example, the different load and speed requirements for golf carts and sports cars, and that the strain, temperature, and frequency are to be specified for the particular application.

Reference numerals depicted in the drawings follow a consistent pattern for each variation. The figures are not drawn to scale, and the dimensions of elements have been exaggerated or reduced as needed for clarity of the illustration.

An exemplary embodiment of a compliant wheel in accordance with the invention is shown in FIG. 1 schematically viewed in the equatorial plane. A compliant wheel in accordance with the invention is useful in applications where the traction, steering, or suspension qualities of a pneumatic tire are advantageous or in need of improvement. A compliant wheel in accordance with the invention can offer improved compliance and stiffness characteristics, in a wheel requiring less maintenance than a pneumatic tire. In addition to use on motor vehicles, such a wheel could also be advantageously used, for example, on a wheel chair, a gurney, a hospital bed, a cart for sensitive equipment, or other vehicles or conveyances where sensitivity to shock is important. In addition, the wheel may be used in place of casters for chairs or other furniture, or as wheels for baby carriages, skate boards, in-line skates, etc. The compliant wheel of the invention could be used in machines or apparatuses where load bearing or load applying wheels are used. The term "vehicle" is used below for the purposes of the description; however, any device on which compliant wheels could be mounted is included in the following description.

Figure 3:
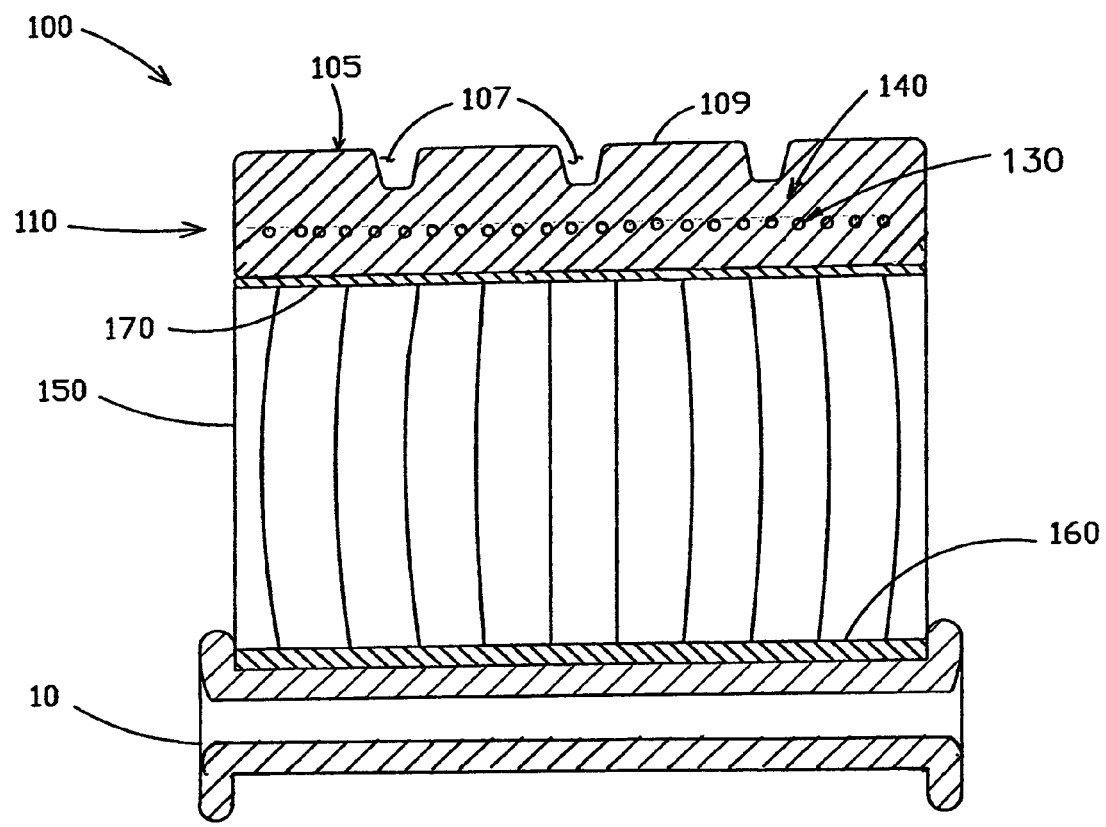
FIG. 3 is a section view in the meridian plane of an embodiment of a compliant wheel of the invention.

The wheel 100 shown in FIG. 1 has a ring-shaped compliant band 110, a plurality of tension transmitting elements, illustrated as web spokes 150, extending transversely across and inward from the compliant band, and a mounting band 160 at the radially inner end of the web spokes. The mounting band 160 anchors the wheel 100 to a hub 10. A tread portion 105 is formed at the outer periphery of the compliant band 110. The tread portion 105 may be an additional layer bonded on the compliant band 110 as shown in FIG. 1, for example, to provide different traction and wear properties than the band material provides. Alternatively, the tread portion 105 may be the outer surface of the compliant band, as shown in FIG. 3. Tread features may be formed in the tread portion 105 and may include grooves 107 and ribs 109.

As mentioned, the web spokes 150 in the exemplary embodiment of FIG. 1 extend transversely across the wheel, which as used herein means that the web spokes 150 extend from side to side of the wheel and may be aligned with the axis of rotation, or may be oblique to the wheel axis. Further, "extending inward" means that the web spokes 150 extend between the compliant band and the hub, and may lie in a plane radial to the wheel axis or may be oblique to the radial plane. In addition, as explained below, a second plurality of web spokes may extend in the equatorial plane.

Figure 2:
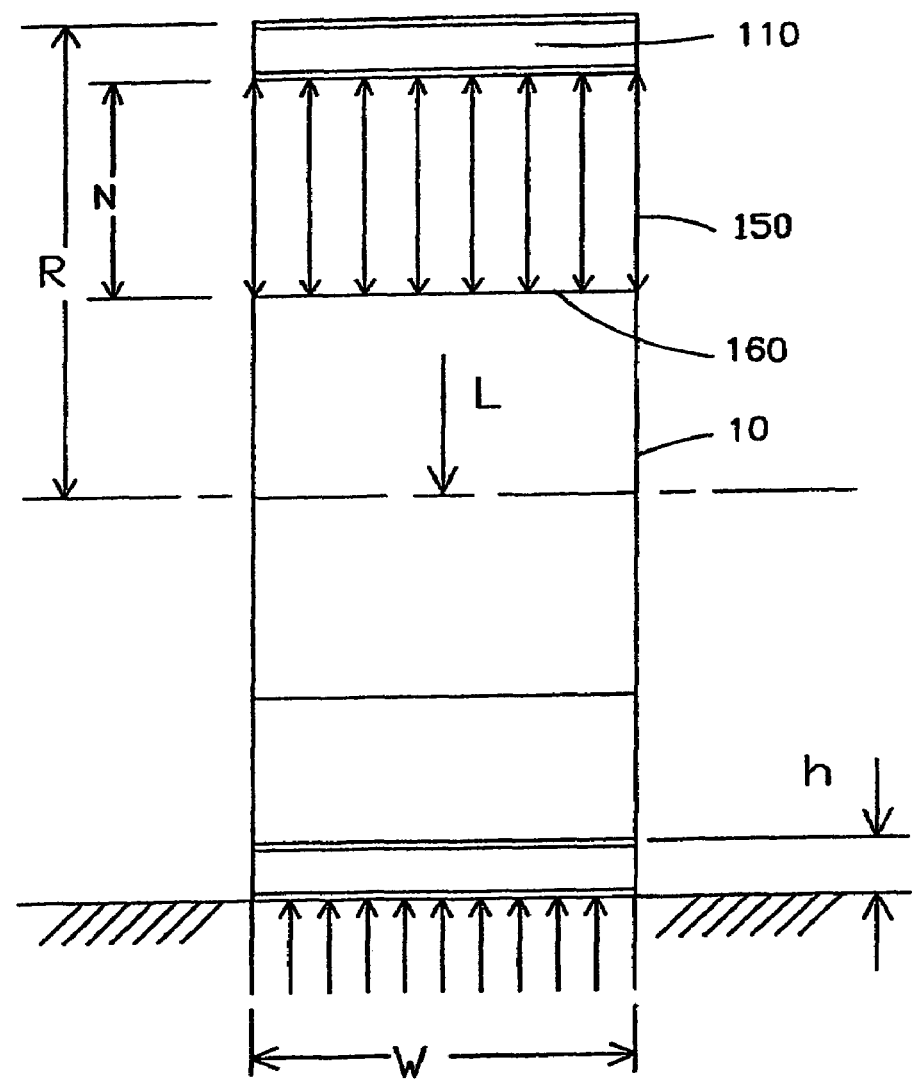
FIG. 2 is a schematic view in the meridian plane of a compliant wheel in accordance with the invention illustrating a load carrying mechanism.

The compliant band 110 supports the load on the compliant wheel and resiliently deforms to conform to the road (or other supporting surface) to provide traction and handling capabilities. As indicated in FIG. 1 and FIG. 2, when a load L is placed on the wheel axis of rotation X, the compliant band 110 bends and otherwise deforms for ground contact in area C to form a contact patch. Portion A of the band 110 not in ground contact acts in a manner similar to an arch and provides a circumferential compression stiffness and a longitudinal bending stiffness in the equatorial plane sufficiently high to act as a load-supporting member. The load L on the wheel 100, transmitted from the vehicle (not shown) to the hub 10 essentially hangs by the web spokes attached to the load supporting portion A. The web spokes in the contact region C do not experience tensile loading due to the load L. As the compliant wheel rotates, of course, the specific portion of the compliant band 110 acting as an arch continually changes, however, the concept of an arch is useful for understanding the load supporting mechanism.

The amount of bending of the compliant band 110, and accordingly, the size of the contact patch or area C is proportional to the load L. The ability of the band to bend resiliently under load provides a compliant ground contact area C that acts similar to that of a pneumatic tire, with similar advantageous results. For example, the compliant band 110 can envelop obstacles to provide a smoother ride. Also, the compliant band 110 is able to transmit forces to the ground or road for traction, cornering, and steering.

By contrast, in typical solid and cushion tires, the load is supported by compression of the tire structure in the contact area, which includes compression of the cushion material under the rigid hub. Compliance of the cushion material is limited by the compression properties of the material and the thickness of the material on the rigid wheel or hub.

The complaint band 110 is formed of elastomeric material. The band elastomeric material may include natural and synthetic rubbers, polyurethanes, foamed rubbers and polyurethanes, segmented copolyesters, and block co-polymers of nylon. Preferably, the elastomeric material has an elastic modulus of about 9 MPa to about 60 MPa. The elastomeric material may be prepared as is known in the art, with fillers, conditioners, curing additives, and the like, in addition to the polymer content, so long as the appropriate compliance, flexibility and resilience properties of the compliant band are obtained.

Repeated deformation of the compliant band 110 during rolling under load causes hysteretic losses leading to heat buildup in the compliant wheel. Thus, hysteresis of the compliant band material should be specified to maintain an operating temperature below the allowable operating temperature for the materials used. For conventional tire materials (e.g., rubber), for example, the hysteresis of the band should be specified to generate a temperature below about 100° C. for compliant wheels in continuous use.

Referring to FIGS. 2 and 3, the web spokes 150 are substantially sheet-like elements having a length N in the radial direction, a width W in the axial direction corresponding generally to the axial width of the compliant band 110, and a thickness perpendicular to the other dimensions. The thickness is much less than either the length N or the width W, which allows a web spoke to buckle or bend when under compression, as shown in FIG. 1. Thinner web spokes will bend when passing through the contact area A with substantially no compressive resistance, that is, supplying no or only insignificant compressive force to load bearing. As the thickness of the web spokes increases, the web spokes may provide some compressive load bearing force in the ground contact area. The predominant load transmitting action of the web spokes as a whole, however, is tension. The particular web spoke thickness may be selected to meet the specific requirements of the vehicle.

As seen in FIG. 2, preferably, the web spokes 150 are oriented relative to the compliant band 110 across the axial direction. Tension in the web spokes 150 (in the upper part of the drawing corresponding to the region A in FIG. 1), therefore, is distributed across the compliant band 110 to support the load L.

According to a presently preferred embodiment, the web spokes 150 are formed of an elastomeric material having a tensile modulus of about 10 to 100 MPa. The web spokes may be reinforced if desired. The web spoke material should also exhibit elastic behavior to return to original length after being strained to 30%, and to exhibit constant stress when the web spoke material is strained to 4%. Further, it is desirable to have a material with a tan δ of not more than 0.1 at the relevant operating conditions. For example, commercially available rubber or polyurethane materials can be identified which meet these requirements. The inventors have found that Vibrathane B836 brand urethane from the Uniroyal Chemical division of Crompton Corporation of Middlebury, Conn. has been suitable for the web spokes.

Referring to FIG. 3, in one embodiment, the web spokes 150 are interconnected by a radially inner mounting band 160, which encircles the hub 10 to mount the wheel to the hub. An interface band 170 interconnects the web spokes 150 at their radially outer ends and connects the web spokes 150 to the compliant band 110. For convenience, the web spokes 150, the mounting band 160, and the interface band 170 may be molded from a single material as a unit.

Alternatively, depending on the construction materials and process for the band 110 and hub or wheel 10, the mounting band 160 or interface band 170 may be eliminated and the web spokes may be molded or formed to directly adhere to the band 110 and hub 10. For example, if the compliant band 110 is formed with the same or compatible materials as the web spokes, the compliant wheel of the invention could be manufactured with one step forming the web spokes, the compliant band, and the mounting band as an integral unit. Similarly, the mounting band could be eliminated by molding the web spokes directly to the hub.

Figure 4:
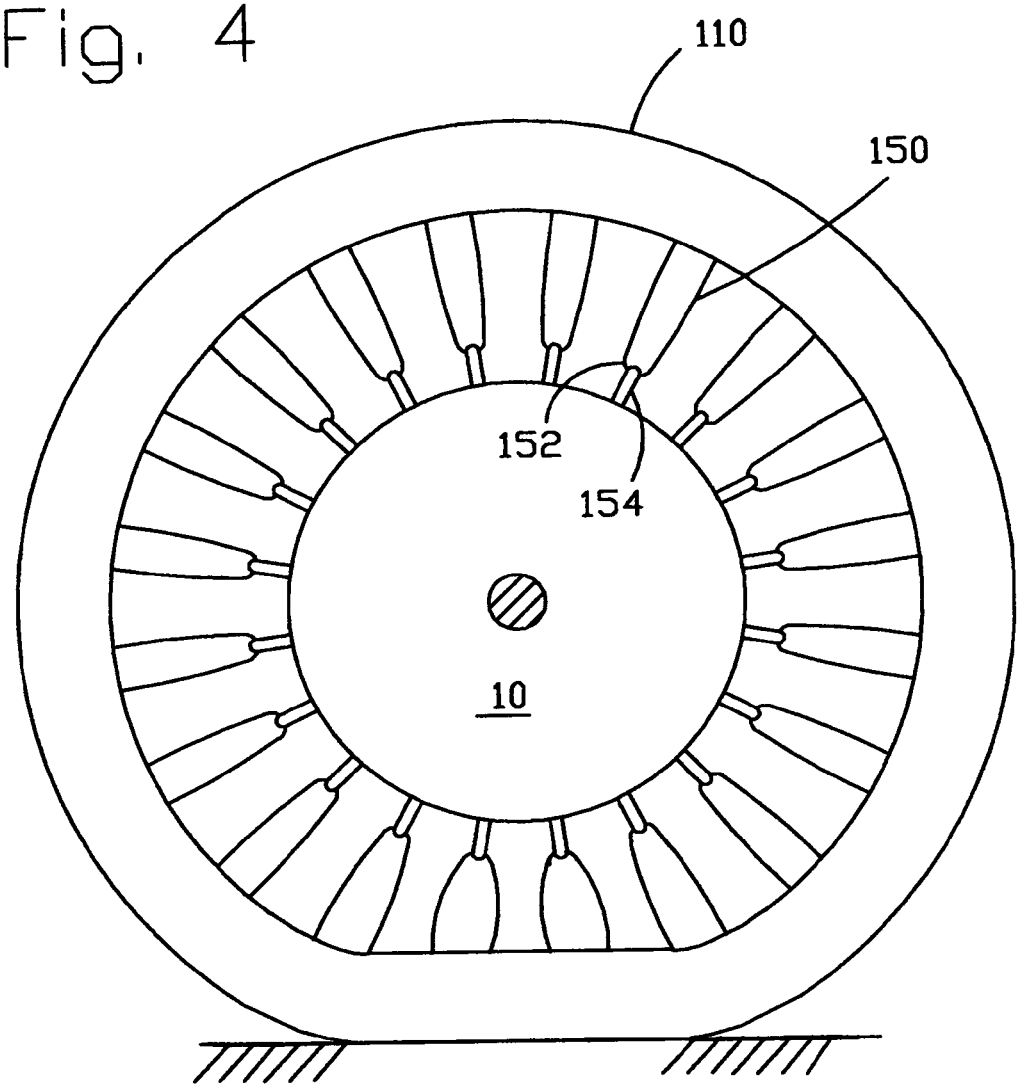
FIG. 4 is a schematic view in the equatorial plane of an alternative embodiment of the compliant wheel in accordance with the invention.

According to a further embodiment, the web spokes 150 could be mechanically attached to the hub, for example, by providing an enlarged portion on the inner end of each web spoke that engages a slot device in the hub, or by attaching adjacent web spokes to form a loop at a hook or bar formed in the hub. FIG. 4 shows one such embodiment, in which web spokes 150 are formed with loops 152 which engage hooks 154 in the outer radius of the hub 10.

Substantially purely tensile load support is obtained by having a web spoke that has high effective stiffness in tension but very low stiffness in compression. To facilitate bending in a particular direction, the web spokes may be curved. Alternatively, the web spokes can be molded with a curvature and straightened by thermal shrinkage during cooling to provide a predisposition to bending in a particular direction.

The web spokes 150 should resist torsion between the compliant band 110 and the hub 10, for example, when torque is applied to the wheels. In addition, the web spokes 150 should resist lateral deflection when, for example, turning or cornering. As will be understood, web spokes 150 that lie in the radial-axial plane, that is, are aligned with both the radial and axial directions, will have high resistance to axially directed forces, but, particularly if elongated in the radial direction, may have relatively low resistance to torque in the circumferential direction. For certain vehicles and applications, for example, those producing relatively low torque, a web spoke package having relatively short spokes aligned with the radial direction will be suitable.

Figure 5:
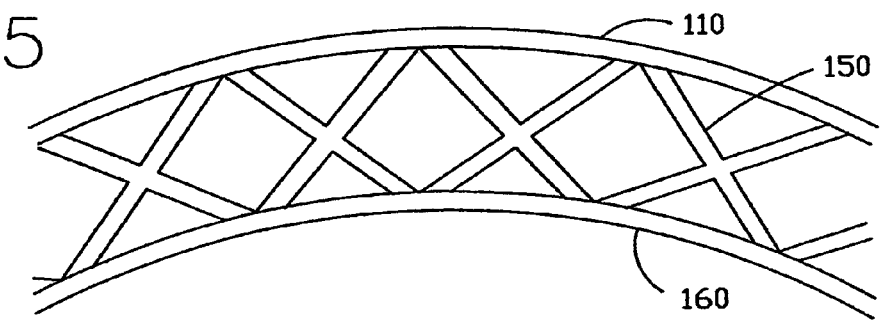
FIG. 5 is a section view showing an arrangement of web spokes in an X pattern for a compliant wheel viewed in the equatorial plane.
Figure 6:
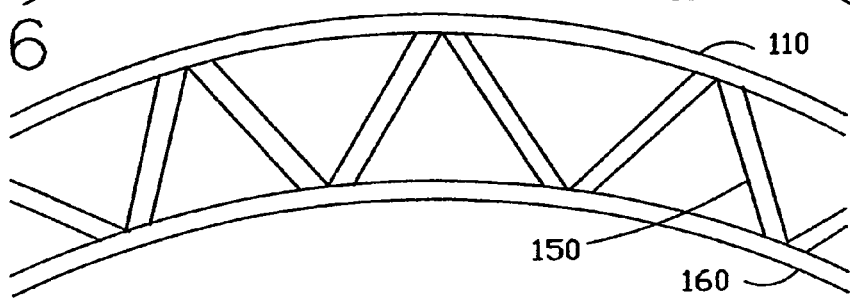
FIG. 6 is a view of an alternative arrangement of web spokes in a "v" pattern viewed in the equatorial plane.
Figure 7:
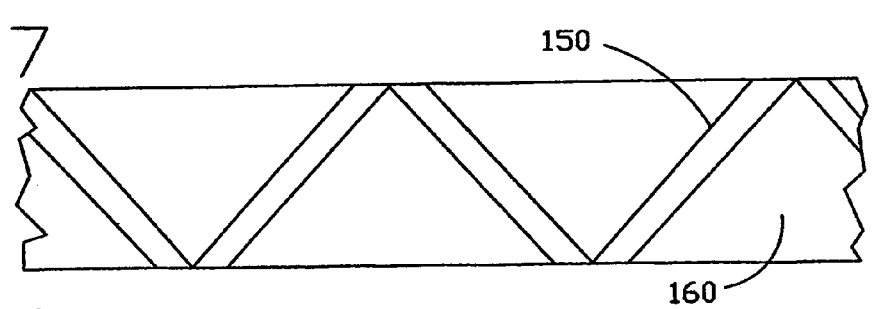
FIG. 7 is a view of an arrangement of web spokes in an oblique axial pattern viewed radially toward the axis of rotation.

For applications where high torque is expected, one of the arrangements such as those illustrated in FIGS. 5–7 may be more suitable. In FIG. 5, the web spokes 150 are oriented in a repeating X pattern as seen in the axial direction, with pairs of spokes forming the X joined at their centers. In FIG. 6, the web spokes are oriented in a zig-zag pattern relative to the radial direction. The web spokes in FIG. 7 are oriented with adjacent web spokes oppositely oriented relative to the axial direction in a zigzag pattern. In these variations, the orientations provide a force-resisting component in both the radial and the circumferential directions, thus adding resistance to torque, while retaining radial and lateral force-resisting components. The angle of orientation may be selected depending on the number of web spokes used and the spacing between adjacent web spokes.

Figure 8:
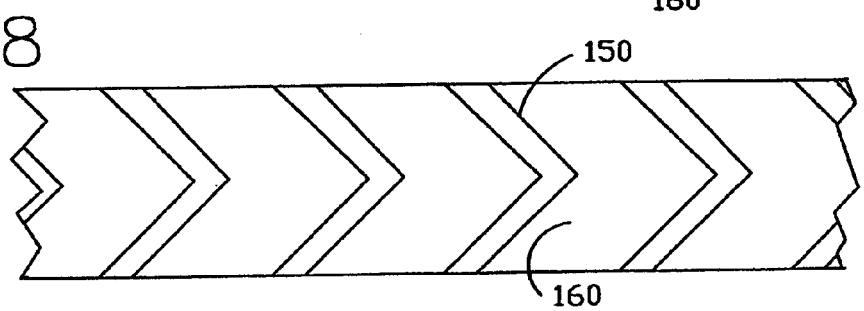
FIG. 8 shows an alternative chevron arrangement of web spokes viewed radially toward the axis of rotation.
Figure 9:
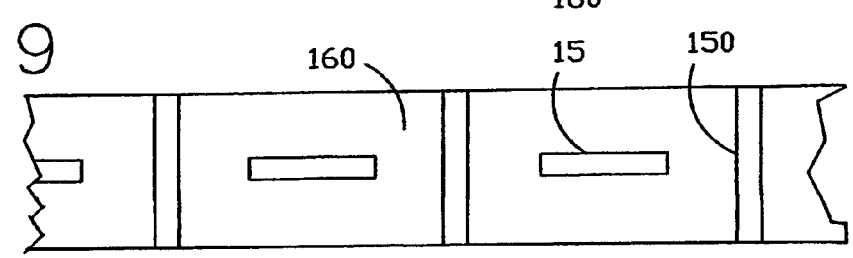
FIG. 9 is shows an alternative arrangement of alternating circumferentially- and axially-aligned web spokes viewed radially toward the axis of rotation.

Other alternative arrangements may be used. As shown in FIG. 8, the web spokes may be arranged in a chevron or v-pattern as viewed in the radial direction. Another alternative is to alternate the orientation of adjacent web spokes between axially aligned and circumferentially aligned as shown in FIG. 9. These alternatives may be less preferred, however, because of difficulties in accommodating bending of the web spokes in the contact region.

One advantage of the compliant wheel of the invention is that the selection of the size and arrangement of the compliant band and the web spokes allow the vertical, lateral, and torsional stiffness of the wheel to be tuned independent of the contact pressure and of each other. The operating parameters of the compliant band 110, load carrying and compliance, are determined in part by selection of materials having the circumferential compression stiffness and longitudinal bending stiffness in the equatorial plane (the plane of the view of FIG. 1) to meet the design load requirements. These parameters are examined in view of the diameter of the compliant wheel, the width of the compliant band in the axial direction, the thickness of the band in the radial direction, and the length and spacing of the web spokes.

The number of web spokes is selected to maintain circularity of the band, and will depend also on the spacing between adjacent web spokes.

The characteristic structure of the compliant wheel that distinguishes it from cushion and spring wheels is that both the load supporting compliant band 110 and the web spokes 150 are resiliently bendable or flexible. This structure raises two considerations: maintaining sufficient uniformity of the load compliant band 110 during load bearing for smooth rolling and preventing fatigue failure of the web spokes from the bending in and out of the contact area.

Figure 10:
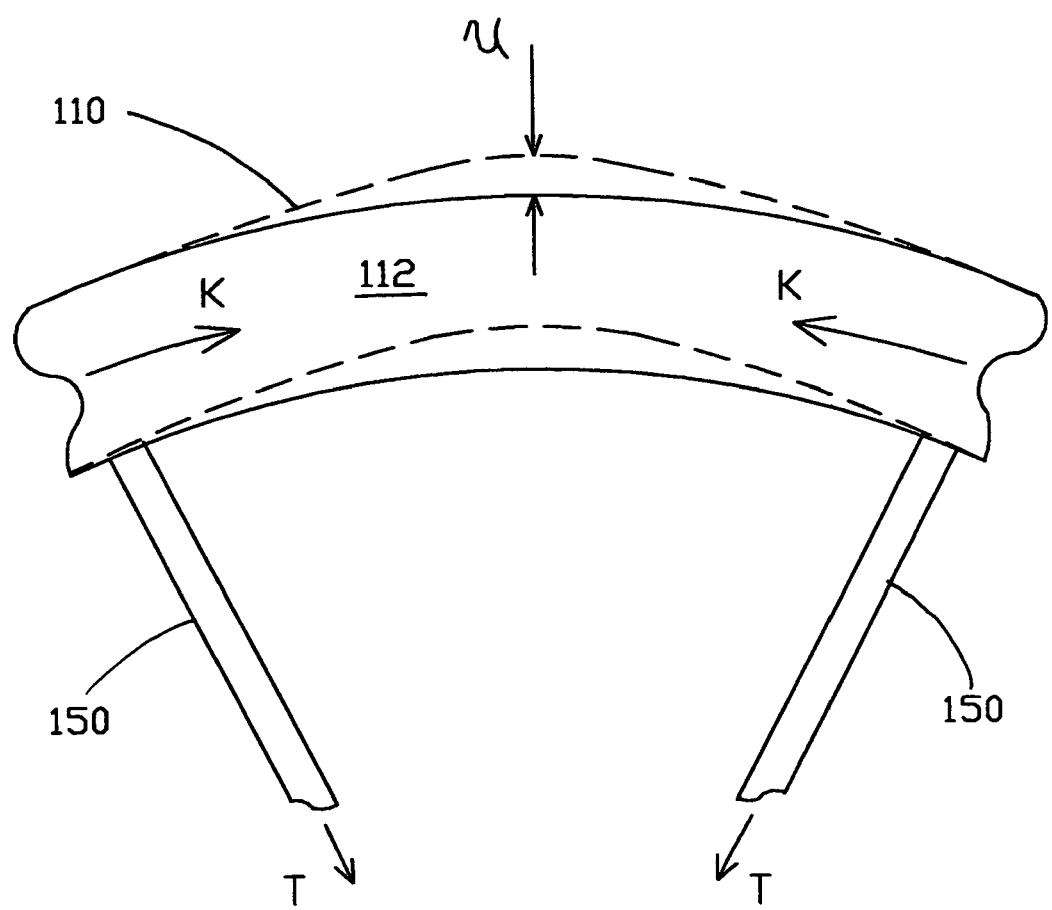
FIG. 10 illustrates in section view a compliant band segment and supporting web spokes to illustrate compressive deformation of the band under load; and, FIG. 11 illustrates schematically counterdeflection stiffness as viewed in the compliant wheel equatorial plane.

The inventors have found that, for the purposes of smooth rolling, the compliant band 110 can be analyzed as a series of beam segments supported at the ends by adjacent web spokes 150, as illustrated schematically in FIG. 10. Tension T in the web spokes 150 from a load applied at the axis results in compressive force K in the beam segment 112 between adjacent web spokes. When the compression exceeds the ability of the beam segment 112 to shorten, buckling occurs, as indicated (in exaggerated scale) by the broken line. The buckling or radial displacement $\mu$ results in non-uniformity in the rolling radius of the complaint band 110 that causes uneven rolling.

By selection of the characteristics of the compliant band 110 and web spokes 150, the radial displacement $\mu$ can be kept within limits for substantially uniform, smooth rolling. Using the following relationship, the radial displacement $\mu$ is related to physical characteristics of the compliant wheel elements:

$$\mu_{p/p} \cong 1.5\left(\frac{1-v^2}{EI}\right)T\left(\frac{r_0}{n}\right)^3$$

where, $\mu_{p/p}$ is the peak to peak radial displacement (mm);
  v is the poisson ratio of the compliant ring;
  E is the modulus of elasticity of the ring (N/mm$^2$);
  I is the moment of inertia of the ring (mm$^4$);
  T is the spoke tension (N);
  $r_0$ is the nominal radius of the ring (mm); and
  n is the number of spokes.

For smooth rolling, the radial displacement $\mu$ should, or course, be small. It is convenient to relate the radial displacement $\mu$ to the radius of the compliant band. A preferred ratio of the nominal radius $r_0$ of the compliant band 110 to the peak to peak radial displacement $\mu$ is at or above a value of about 1500, or $$\frac{r_0}{\mu} \geq 1500$$

This ratio of radius to radial displacement may be obtained by modification of the different parameters of the compliant band 110 and web spokes 150, as suggested by the equation, for example, by increasing the number of spokes or by increasing the stiffness of the compliant band.

Another factor for consideration in design of a compliant wheel is the fatigue life of the web spokes. Depending on the amount of deflection the compliant band undergoes while loaded, the web spokes could experience significant bending stresses, leading to fatigue. The maximum spoke strain energy should be below the fatigue limit of the spoke material for the number of cycles expected for a given application. The maximum strain energy for the radial web spoke can be estimated using the following:

$$\text{Maximum Strain Energy} \cong 27.75\left(\frac{Et^2}{L^2(1-v^2)}\right)\left(\frac{\Delta L}{L}\right)^{1.18}$$

where, v is the spoke poisson ratio;
  E is the spoke modulus of elasticity (N/mm$^2$);
  L is the spoke length (mm);
  $\Delta L$ is the maximum radial displacement of the spoke (mm); and,
  t is the spoke thickness in the circumferential direction (mm) assuming a rectangular cross section.

Figure 11:
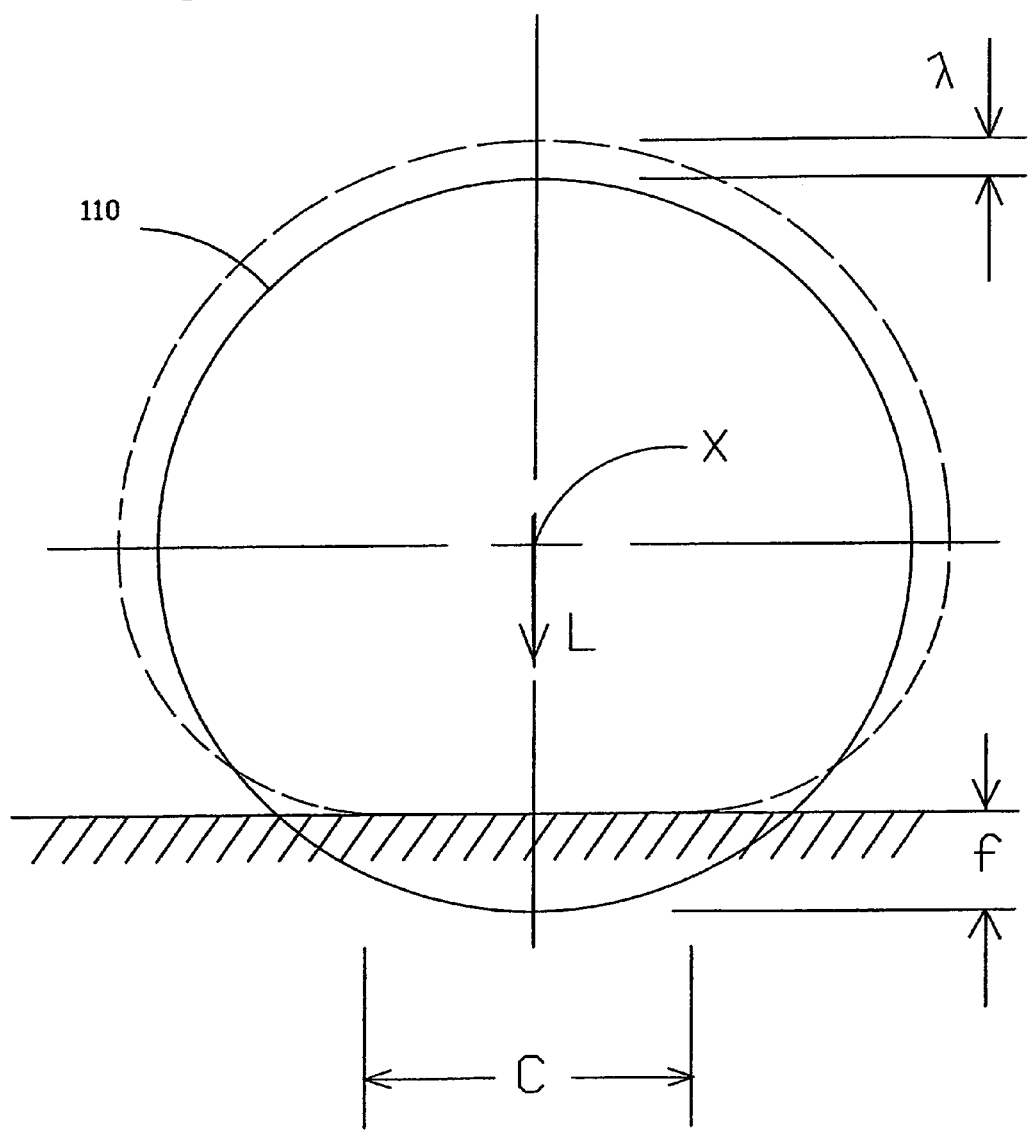

Vertical stiffness relates to the ability of the wheel to resist deflection when under load. Vertical stiffness of the wheel is strongly influenced by the reaction to the load of the portion of the wheel not in contact with the ground, the "counter-deflection" of the compliant wheel. FIG. 11 illustrates this phenomenon in exaggerated scale. When the wheel is under a load L, it deflects an amount f and the portion in ground contact conforms to the ground surface to form a ground contact area C. Note that for the purposes of this description the frame of reference in FIG. 11 maintains the compliant wheel axis X at a constant location and moves the ground upward toward the axis. The compliant wheel is a resilient body, and accordingly, vertical deflection f is proportional to the load L, from which the vertical stiffness $K_v$ of the compliant wheel may be derived.

The circumferential stiffness of the compliant band 110 (shown schematically) will resist stretching, compressing, and bending under load in seeking to maintain its unloaded circumference. Accordingly, when under load, the portion of the compliant wheel not in ground contact shifts, or counterdeflects, away from the contact area C, as indicated by the broken lines in the figure. The counterdeflection amount $\lambda$ is also proportional to the load L, and a counterdeflection stiffness $K_\lambda$ may thus be obtained. Counterdeflection stiffness $K_\lambda$ relates primarily to the circumferential compressive stiffness of the band and the way that the web spokes not in ground contact bear load. To a lesser extent the transverse and longitudinal bending of the band are involved.

Counterdeflection can be measured directly by placing a compliant wheel under a load F with the axis fixed and measuring both deflection f of the compliant wheel in the contact area and the deflection of the tread surface opposite the contact area. Counterdeflection stiffness is then determined by dividing the load F by the counterdeflection amount $\lambda$.

In practice, counterdeflection stiffness $K_\lambda$ substantially controls the vertical stiffness of the compliant wheel, and accordingly, the deflection under load of the axis of a compliant wheel. Low counterdeflection stiffness allows the compliant band 110 to move vertically under load, and thus reduces the load capacity at that deflection. Counterdeflection stiffness $K_\lambda 0$ determines the length of the contact area, as may be seen in FIG. 10. Accordingly, a compliant wheel having high counterdeflection stiffness has relatively less counterdeflection and a longer contact area.

Vertical stiffness can be adjusted to optimize the load carrying capability of a given compliant wheel. Alternatively, vertical stiffness can be adjusted to provide a compliant band of reduced thickness for reduced contact pressure or compliant wheel mass while maintaining a desired level of vertical stiffness.

Counterdeflection stiffness $K_\lambda$ can be modified in a number of ways. Some of the design parameters used to adjust this stiffness include the web spoke modulus, web spoke length, web spoke curvature, web thickness, the compliant wheel diameter, the thickness of the compliant band layer, and the width of the compliant band.

According to a preferred embodiment, the compliant band 110 includes a reinforcing layer 130 to constrain the circumference of the band as it deforms under load. Preferably, the reinforcing layer or ply is disposed at or slightly inward of the neutral axis of the band, that is, approximately midway between the radial outer and inner surfaces, or slightly radially inward of the neutral axis. The reinforcing ply 130 will act in tension in the circumferential direction of the compliant band.

Any suitable material may be employed for the reinforcement. The reinforcing layer structure may be any of several alternatives such as a homogeneous material (e.g., thin metal sheet), a fiber reinforced matrix, or a layer having discrete reinforcing elements. It is within the scope of the invention for reinforcing ply 130 to be adhered to or in the compliant band 110 by any suitable method of chemical or adhesive bonding or mechanical fixation. The ply 130 may include two or more layers.

The reinforcing layer in a preferred embodiment includes a plurality of essentially inextensible cord reinforcements embedded in an elastomeric coating. For a compliant wheel constructed of elastomeric materials, the reinforcing ply 130 may be positioned between two partial layers of the elastomeric material 120 and adhered by the cured elastomeric materials. Alternatively, the reinforcing ply 130 may be embedded during the process of molding the compliant band itself. The reinforcing elements in the ply 130 may be any of several materials suitable for use as compliant wheel belt reinforcements in conventional tires such as monofilaments or cords of steel, aramid or other high modulus textiles. For the illustrative compliant wheels described herein, the reinforcements are steel cords, each consisting of four wires of 0.26 mm diameter (4×0.26).

The ply 130 includes a plurality of essentially parallel cords oriented at any angle relative to the circumference. One advantageous arrangement is cords oriented about 0° to relative to the compliant wheel equatorial plane for increased tensile stiffness.

Alternatively, if two or more plies are provided, the cords of the respective layers may be disposed at angles to the circumferential direction and at opposite orientation to one another.

The cords are embedded in an elastomeric coating layer typically having an elastic modulus of about 9 to 60 MPa.

Applicants understand that many other variations are apparent to one of ordinary skill in the art from a reading of the above specification. These variations and other variations are within the spirit and scope of the instant invention as defined by the following appended claims.

What is claimed is:

1. A compliant wheel, comprising:
  a hub;
  a compliant band disposed radially outward of the hub; and,
  a plurality of tensile force transmitting elements extending between the hub and the compliant band and connected thereto, wherein, the tensile force transmitting elements transmit tensile force between the hub and ring, and transmit no substantial force in compression, and a ratio of the nominal radius of the compliant band to the peak to peak radial displacement of the compliant band is equal to or greater than about 1500.

2. The compliant wheel as claimed in claim 1, further comprising a reinforcing ply embedded in the band.

3. The compliant wheel according to claim 2, wherein the reinforcing ply comprises at least one layer of essentially inextensible cord reinforcements embedded in an elastomeric coating layer having a shear modulus of elasticity at least equal to the shear modulus of elasticity of the compliant band.

4. The compliant wheel as claimed in claim 2, wherein the reinforcing ply is located at approximately the neutral axis of the band.

5. The compliant wheel as claimed in claim 2, wherein the reinforcing ply is located at radially inward of the neutral axis of the band.

6. The compliant wheel as claimed in claim 1, further comprising a tread formed on a radially outer surface of the band.

7. The compliant wheel as claimed in claim 1, wherein the compliant band is formed of an elastomeric material having an elastic modulus of about 9 MPa to about 60 MPa.

8. The compliant wheel according to claim 1, wherein the tensile force transmitting elements comprise web spokes extending transversely across the compliant band.

9. The compliant band as claimed in claim 8, wherein the web spokes are oriented parallel to the axial direction.

10. The compliant wheel according to claim 8, wherein each web spoke is oriented oblique to the axial direction.

11. The compliant wheel according to claim 10, wherein mutually adjacent web spokes are oriented at opposite oblique angles to the axial direction.

12. The compliant wheel according to claim 8, wherein mutually adjacent web spokes are oriented at opposite oblique angles to the radial direction forming a zigzag in the equatorial plane.

13. The compliant wheel according to claim 8, wherein the plurality of web spokes are oriented in crossed pairs forming a repeating X-pattern in the equatorial plane.

14. The compliant wheel according to claim 8, wherein the web spokes have a curvature in the equatorial plane to facilitate bending when under compression in the radial direction.

15. The compliant wheel according to claim 8, wherein a first plurality of web spokes is oriented parallel to the axial direction and a second plurality of web spokes is oriented perpendicular to the axial direction.

16. The compliant wheel according to claim 8, wherein each web spoke has a thickness that is not more than about 5% of a radius of the compliant wheel.

17. The compliant wheel according to claim 8, wherein the web spokes are formed of an elastomeric material having an elastic modulus of about 9 to 60 MPa.

18. The compliant wheel according to claim 8, wherein the compliant band and the plurality of web spokes are an integrally molded unit formed of a single material.

19. A compliant wheel, comprising:

a hub;

a compliant band of elastomeric material disposed radially outward of the hub;

a reinforcing ply embedded in the band; and, a plurality of flexible web spokes extending between the compliant band and the hub, wherein the compliant band and the plurality of web spokes are an integrally molded unit formed of a single material and a ratio of the nominal radius of the compliant band to the peak to peak radial displacement of the compliant band is equal to or greater than about 1500.

* * * * *